Oct. 15, 1935.     F. J. WESTROPE     2,017,556
WINDOW GLASS RUNWAY
Filed Nov. 16, 1931
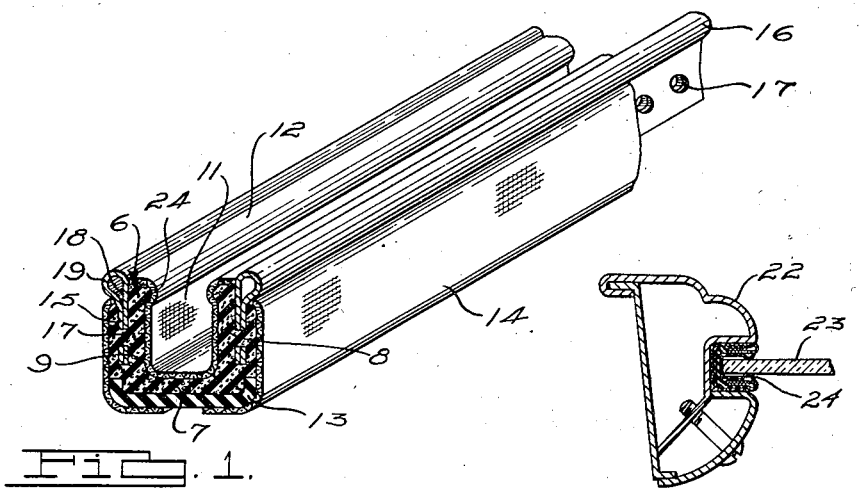
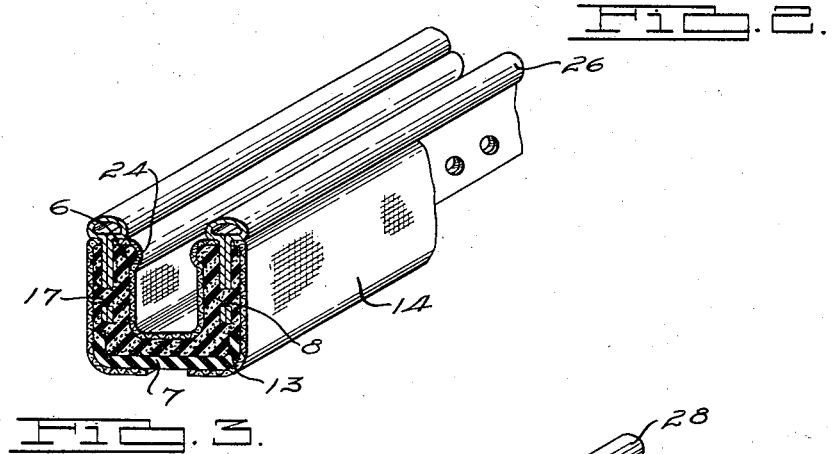
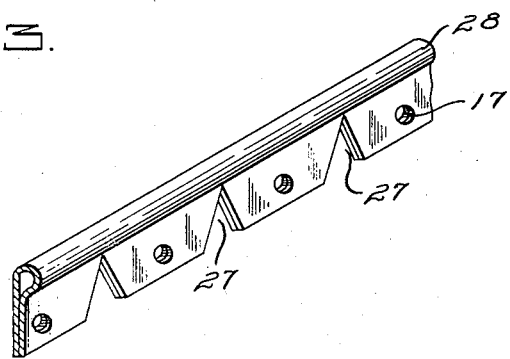
INVENTOR
Fred J. Westrope.
BY
ATTORNEYS.

Patented Oct. 15, 1935

2,017,556

UNITED STATES PATENT OFFICE 2,017,556

WINDOW GLASS RUNWAY

Fred J. Westrope, Detroit, Mich., assignor, by mesne assignments, to The Reid Products Company, Cleveland, Ohio, a corporation of Ohio Application November 16, 1931, Serial No. 575,167

11 Claims. (Cl. 296—44.5)

My invention relates to window glass runways and particlularly to a window glass runway of the protective type for receiving and supporting the window against shock and at the same time to provide a metal finish surface, disconnected from the glass, on the outer visible portion of the runway.

It has been the practice in the past to provide a glass run channel in doors and bodies of vehicles in which the window glass is slidably retained. Within the glass receiving channel a rubber channel strip was supported for the purpose of encompassing the edges of the glass and retaining it out of contact with the metal portions of the door and body to prevent breaking. The glass encompassing strip was usually made of rubber and ordinarily covered with a frictionless material such as velvet to permit the glass to readily slide within the strip.

In practicing my invention I provide a rubber channel strip made of sponge rubber and provided with a bottom portion of hard rubber which is vulcanized or adhered thereto in a well known manner and cover the strip with non-friction material such as velvet as has been the practice in the past, and in addition provide the side portions of the channel strip with a metal strip which extends over the end of the rubber channel strip to thereby provide a metal finishing strip which will be visible about the edge of the glass.

The main objects of my invention are; to provide a channel strip for encompassing the edges of slidable glass windows which is made of sponge rubber and provided with a frictionless cover to permit the movement of the glass therein; to provide a reinforcing member along the bottom and lower side edges of the channel member made of hard rubber to strengthen the strip and to provide a certain amount of flexibility thereto; to provide an insert strip for each side of the channel members having extending portions which are embedded therein and secured thereto in such manner as to have the metal extend over substantially the visible portion of the strip to provide a metal finish about the edges of the glass; to provide a metal reinforcing member for the edges of the channel member which are so secured therein as to permit a certain amount of flexibility of the channel strip longitudinally of its length; and, in general, to provide a finish strip for the edge of a slidable glass window which is pleasing in appearance and which protects the edges of the glass from shock and jar and at the same time to permit the glass to slide readily in the channel element.

Other objects and features of novelty of my invention will be either specifically pointed out or will become apparent when referring, for a better understanding of my invention, to the following description in conjunction with the accompanying drawing, wherein:

Figure 1 is a perspective view in section of a channel strip embodying features of my invention;

Fig. 2 is a sectional view of the structure illustrated in Figure 1 mounted in a channel of a door about the edge of a slidable glass window;

Fig. 3 is a perspective view in section of a structure similar to that illustrated in Figure 1 with the exception that the metal member is constructed in such manner as to extend over a greater amount of the end surface of the channel side, and Figure 4 is a perspective view in section of another form of metal strip which I may employ with my window receiving strip.

My invention comprises in general a glass window receiving strip 6 made of sponge rubber having a bottom web portion 7 and upstanding side portions 8 and 9 forming a channel 11 in which the glass is received. A material 12, such as velvet or the like, is secured to the inner walls of the channel 11 and extend over the top portion thereof as illustrated in Figure 1 for the purpose of providing a non-friction surface which permits the movement of the glass when slidable. Across the bottom web 7 and extending a short way up the side of the strip 6, I provide a reinforcing member 13 made of hard vulcanized rubber which is vulcanized or otherwise adhered to the sponge rubber strip 6 to provide a strengthening support for the strip to retain it in predetermined form. Material 14, similar to the velvet material 12, is secured to the outer surface of the sides 8 and 9 and the reinforcing strip 13 for finishing the outer surface of the strip.

Slots 15 are provided in the sides 8 and 9 of the strip 6 extending downwardly through the top thereof a predetermined distance for receiving the metal finish strips 16 which are inserted therein and retained fixed thereto in a predetermined manner. I preferably mold the sponge rubber material 6 about the strips 16 and provide the strips with a plurality of apertures 17 through which the rubber material extends to thereby retain the metal strip as a unit portion of the channel strip. The metal strip 16 is provided with a web 18 which is rolled at the top edge at 19 and extends downwardly at 21 adjacent to the web 18 to thereby provide a rounded finish edge along the top of the sides 8 and 9 which provides a finish about the window. The strip 16 is preferably made of stainless steel, although other suitable metals may be employed and finished in a predetermined manner by plating, polishing or painting.

In Figure 2, I have illustrated a section of a door 22 wherein the channel strip 6 is secured in a well known manner about the edge of a glass window 23 which is slidable in the strip. It will be noted in the view, that the inner upper edge of the strip extends inwardly, at 24, toward each other in firm engagement with the window to retain the window out of contact with the metal strip 16 and at the same time to provide a predetermined pressure thereto to prevent rattle and to prevent the entire inner side surface of the channel 11 from engaging the window which would increase the friction thereof and oppose its easy movement in the channel. In this construction, it will be noted that the metal strips 16 are clear of the glass but are in engagement with the edges of the door channel to thereby provide a finish thereto which hides the unsightly cloth which was heretofore apparent when provided on the channel strip. With my present construction the only portion of the strip which is visible is the finish strip 16 which may have a highly polished surface or which may be painted to conform to the color of the door, to thereby be pleasing in appearance.

In Figure 3, I have shown a somewhat modified form of the construction illustrated in Figure 1 wherein the strip 16 is provided with an enlarged oval top 26 which covers a greater portion of the upstanding sides 8 and 9 to thereby further enhance the appearance of the finish strip by assuring the complete metal coverage of the end thereof.

In Figure 4 I have shown a modified form of the strip 16 wherein I have provided cut-away portions of the webs 18 and 21, to provide angle shaped slots 27 therein disposed a predetermined distance apart to permit the bending of the strip to conform to the shape of the window channel. When a channel strip 6 is made up, having the element 28 therein, which is that illustrated in Figure 4, the molding strip is susceptible to being bent to conform to the contour of the channel of the window openings in the same manner as if the metal strip had been omitted from the structure. When the channel strip is bent to conform to the curvature of the window run, the form will be retained by the strip at all times and will be free from sagging or buckling which had occurred heretofore when strips made entirely of rubber were employed.

My fabricated strip thus constructed, provides an extremely neat finish for the edges of the glass run channel and the glass, and at the same time provides rigidity both longitudinally and laterally of the channel in the presence of the side reinforcing elements and the reinforcing bottom portion, to thereby have the channel retained in predetermined shape. I have further extended the novelty of my invention by providing side finish elements which may be bent a predetermined amount in any direction so that the channel may follow the slope or contour of the glass run about the window opening.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A runway strip for a slidable window glass which includes, in combination, a channel strip of sponge rubber having a web portion and two upstanding side portions, a reinforcing strip of rubber extending across the web portion of the channel strip, metal finish strip having longitudinally spaced portions embedded in the upstanding side portions of said channel strip forming a bendable finish strip for the top edges thereof, and frictionless material secured on the inner surface of said channel strip.

2. A window glass receiving strip which includes, in combination, a transversely compressible channel strip formed of form-sustaining yieldably compressible material, a yieldably compressible reinforcing strip for the bottom thereof less yielding than the material of said channel strip, and separate finish strips of metal covering the top edges of the flanges of said compressible channel strip, and secured thereto by longitudinally spaced strip portions extending into the channel flanges.

3. A window glass receiving strip which includes, in combination, a channel strip of resilient material having upstanding side portions, and separate finish strips of metal secured to said channel strip by longitudinally spaced portions extending into the channel strip and extending above the top edges of the upstanding sides thereof, the channel being transversely resilient for compressible reception within a window frame groove.

4. A window glass receiving strip including, in combination, a channel strip of resilient material comprising a bottom web portion and upstanding side portions, and a separate metal finish strip having underlying portions downwardly embedded in and between opposite faces of upstanding side portion and the finish strips extending over a greater portion of the top surface of said side portion than the embedded portions for effecting a finish thereto.

5. A window glass receiving strip including, in combination, a channel strip of resilient material comprising a transversely compressible longitudinally resilient web portion and upstanding side portions, a finish strip of metal secured to an upstanding side portion projecting above the top edge thereof, said finish strip being provided with cutaway portions which permit the strip to be bent along its longitudinal dimension.

6. A window glass receiving strip which includes, in combination, a channel strip of resilient material comprising a web portion and upstanding side portions, and finish strips of metal provided with a finish portion extending above the top edges of said side portions and with downwardly extending portions having apertures about which said channel member is molded so as to have the material thereof extend through said apertures for securing said finish strips thereto.

7. As an article of manufacture adapted to be associated with a bendable molded rubber or like channel during the manufacture of the same, a bendable strip of bead material and a longitudinal series of elongated anchoring devices extending laterally therefrom, at least some of the devices comprising an anchor portion adapted to be embedded in and embraced by the channel material to prevent displacement of the strip upon bending the channel and strip.

8. In a window frame element, an elongated body of rubber or like flexible material, bendable to conform it to rounded window frame portions, an elongated bendable bead element disposed longitudinally along a surface portion of the body, and securing means comprising a longitudinal series of anchoring devices on the bead element embedded in the material of the body and securing the bead element upon the body and permitting it to bend with the body.

9. In a window frame element, an elongated body of rubber or like flexible material, bendable to conform it to rounded window frame portions, and comprising a flange bendable edgewise, an elongated bendable bead element disposed longitudinally along a surface portion of the flange, and securing means comprising a plurality of relatively spaced anchors embedded in the flange securing the bead element upon the flange and permitting the bead to bend with the flange.

10. As an article of manufacture adapted to be associated with a bendable molded rubber or the like channel during the manufacture of the same, a strip of bead-finish material comprising a folded sheet metal strip generally U-form in cross-section having a longitudinal bead at the fold and a longitudinal series of serrations in the legs of the U providing elongated anchoring devices extending laterally from the bead, at least some of the devices comprising an anchor portion adapted to be embedded in and embraced by the channel material to prevent displacement of the strip upon bending of the channel and strip.

11. As an article of manufacture adapted to be associated with a bendable molded rubber or the like channel during the manufacture of the same, a strip of bead-finish material comprising a strip of sheet metal or the like having a longitudinally folded bead portion and a longitudinal series of serrations providing a longitudinal series of anchoring devices extending laterally from the bead portion, at least some of the devices comprising an anchor portion adapted to be embedded in and embraced by the channel material to prevent displacement of the strip upon bending of the channel and strip.

FRED J. WESTROPE.